US008271602B2

(12) United States Patent
Jin et al.

(10) Patent No.: US 8,271,602 B2
(45) Date of Patent: Sep. 18, 2012

(54) SYSTEM AND METHOD FOR CONVERSATION BASED ON WEB SERVICE ADDRESSING

(75) Inventors: Lei Jin, Belmont, CA (US); Brian Zotter, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 417 days.

(21) Appl. No.: 11/329,898

(22) Filed: Jan. 11, 2006

(65) Prior Publication Data

US 2007/0162549 A1 Jul. 12, 2007

(51) Int. Cl.
G06F 15/16 (2006.01)
(52) U.S. Cl. ........ 709/207; 709/200; 709/204; 709/206; 709/217; 709/220; 370/260; 715/733; 715/753
(58) Field of Classification Search .......... 709/204–207, 709/217; 370/260; 715/733, 753
See application file for complete search history.

(56) References Cited

U.S. PATENT DOCUMENTS

| | | | | |
|---|---|---|---|---|
| 5,903,723 | A * | 5/1999 | Beck et al. ..................... | 709/200 |
| 6,260,148 | B1 * | 7/2001 | Aggarwal et al. ............... | 726/14 |
| 6,426,948 | B1 * | 7/2002 | Bowman-Amuah .......... | 370/260 |
| 6,968,367 | B1 | 11/2005 | Vassar et al. ................... | 709/219 |
| 7,003,571 | B1 | 2/2006 | Zombek et al. ............... | 709/227 |
| 7,349,968 | B2 | 3/2008 | Johnson | |
| 2003/0005181 | A1 | 1/2003 | Bau et al. | |
| 2004/0078486 | A1 | 4/2004 | Salahshoor et al. | |
| 2004/0143645 | A1 | 7/2004 | Cheenath | |
| 2004/0230650 | A1 * | 11/2004 | Vambenepe et al. .......... | 709/204 |
| 2005/0021689 | A1 * | 1/2005 | Marvin et al. ................ | 709/220 |
| 2005/0038863 | A1 * | 2/2005 | Onyon et al. ................. | 709/207 |
| 2005/0086316 | A1 * | 4/2005 | Chen ............................. | 709/207 |
| 2005/0091362 | A1 | 4/2005 | Shigeta et al. | |
| 2005/0204051 | A1 | 9/2005 | Box et al. | |
| 2006/0039401 | A1 | 2/2006 | Shenfield et al. | |
| 2006/0133385 | A1 | 6/2006 | Trossen et al. | |
| 2006/0200522 | A1 * | 9/2006 | Guest ........................... | 709/206 |
| 2007/0162560 | A1 * | 7/2007 | Jin ................................ | 709/217 |
| 2008/0189350 | A1 * | 8/2008 | Vasa et al. .................... | 709/201 |

OTHER PUBLICATIONS

World Wide Web Consortium (W3C), "Web Services Addressing (WS-Addressing)", W3C Member Submission Aug. 10, 2004, 24 pages.
Ruth et al., "A Framework for Applications Utilizing Web Services With Callbacks", 2005 IEEE International Conference on Web Services, 2005, p. 829-30, 3 pages.
Vinoski, "Web Service References" IEEE Internet Computing, [IEEE-Internet-Comput-USA], Mar.-Apr. 2005, vol. 9, No. 2, p. 96, 94-5, 3 pages.

* cited by examiner

Primary Examiner — Thu Ha Nguyen
(74) Attorney, Agent, or Firm — Fliesler Meyer LLP

(57) ABSTRACT

Embodiments of the present invention introduces mechanisms that allow conversational Web services to have long running business transactions between multiple parties with persistent states. Web service addressing is used to exchange conversational identifiers between the client(s) who requests the service and the server who provides it. This description is not intended to be a complete description of, or limit the scope of, the invention. Other features, aspects, and objects of the invention can be obtained from a review of the specification, the figures, and the claims.

21 Claims, 9 Drawing Sheets

```
public class Foo {
  // This annotation is necessary for dependency injection
  @ServiceClient
  private HelloWorld hw;

public void bar() {
    Stub stub = (Stub)hw;
    stub._setProperty(Stub.ENDPOINT_ADDRESS_PROPERTY, "http://localhost:7001/hello/world");
    AsyncPreCallContext ctx = AsyncCallContextFactory.getAsyncPreCallContext();
    ctx.setProperty("name", "lei");
    hw.echoAsync(ctx, "hi there");
    hw.echoAsync(AsyncCallContextFactory.getAsyncPreCallContext(), "hi there 2");
  }
  // This method will be invoked when the asynchronous result for echo() comes back
  @AsyncResponse(target="hw", operation="echo")
  public void onEchoResponse(AsyncPostCallContext ctx, String resp) {
    // In the case that we call echo twice on the same stub, or
    // have two stubs that both have the echo method, then we'll need
    // to look at the call context to resolve
    assert("echo".equals(ctx.getMethodName()));
    assert("hw".equals(ctx.getStubName()));
    assert("hi there".equals(resp) ? "lei".equals((String)ctx.getProperty("name")) :
                    (ctx.getProperty("name") == null));
  }
  // This method will be invoked when the asynchronous exception for echo() comes back
  @AsyncFailure(target="hw", operation="echo")
  public void onEchoFailure(AsyncPostCallContext ctx, InvalidException failure) {
    // Similar code to onAsyncResponse
  }
}
```

Figure 9 (a)

```
@WebService(name="HelloWorld", serviceName="HelloWorldService")
@WLHttpTransport(contextPath="hello", serviceUri="world")
public class HelloWorld {
  @WebMethod
  public String echo(String message) throws InvalidException {
    if (...) throw new InvalidException();
    return message;
  }
}
```

Figure 9 (b)

SYSTEM AND METHOD FOR CONVERSATION BASED ON WEB SERVICE ADDRESSING

CROSS-REFERENCE TO RELATED APPLICATIONS

This application is related to the following co-pending application which is hereby incorporated by reference in its entirety:

U.S. patent application Ser. No. 11/330,308 entitled SYSTEM AND METHOD FOR CALLBACKS BASED: ON WEB SERVICE ADDRESSING by Lei Jin and Brian Zotter, filed concurrently.

U.S. patent application Ser. No. 11/330,309 entitled SYSTEM AND METHOD FOR ASYNCHRONOUS REQUEST RESPONSE by Lei Jin, filed concurrently.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

This application is related to the following patent which is hereby incorporated by reference in its entirety:

Web Services Addressing (WS-Addressing), W3C Member Submission 10 Aug. 2004. http://www.w3.org/Submission/ws-addressing/

FIELD OF THE INVENTION

This invention relates to the field of conversation between clients and a Web service provider.

BACKGROUND

Web service addressing, such as WS-Addressing for a non-limiting example, specifies how to identify address on the Web. When a client starts a service request to a Web service provider, the service provider may assign the client a case number. In the future, the client needs to include that case number for any communication with the service provider and it will be able to look up the case associated with the client. Web service addressing provides a way for the service provider to inform the client about the case number that should be included in every future communications.

Web service addressing can define two interoperable constructs that convey information typically provided by transport protocols and messaging systems. These constructs normalize this underlying information into a uniform format that can be processed independently of transport or application. These two constructs are endpoint (client or service provider) references (EPRs) and message information headers. A Web service endpoint (i.e., service provider) is a referenceable entity, processor, or resource where Web service messages can be targeted. Endpoint references convey the information needed to identify/reference a Web service endpoint, and may be used in several different ways: endpoint references are suitable for conveying the information needed to access a Web service endpoint, but are also used to provide addresses for individual messages sent to and from Web services. To deal with this last usage case, Web service addressing may also define a family of message information headers that allows uniform addressing of messages independent of underlying transport. These message information headers convey end-to-end message characteristics including addresses for source and destination endpoints as well as message identity. Both of these constructs are designed to be extensible and re-usable so that other specifications can build on and leverage endpoint references and message information headers. Some noticeable applications of Web service addressing can include but are not limited to: conversation, callback, and asynchronous request response, all discussed in the following context.

BRIEF DESCRIPTION OF THE DRAWINGS

FIG. 9 (a)-(b) are illustrations of an exemplary asynchronous request response implementation in one embodiment of the present invention.

DETAILED DESCRIPTION

Figure 1:
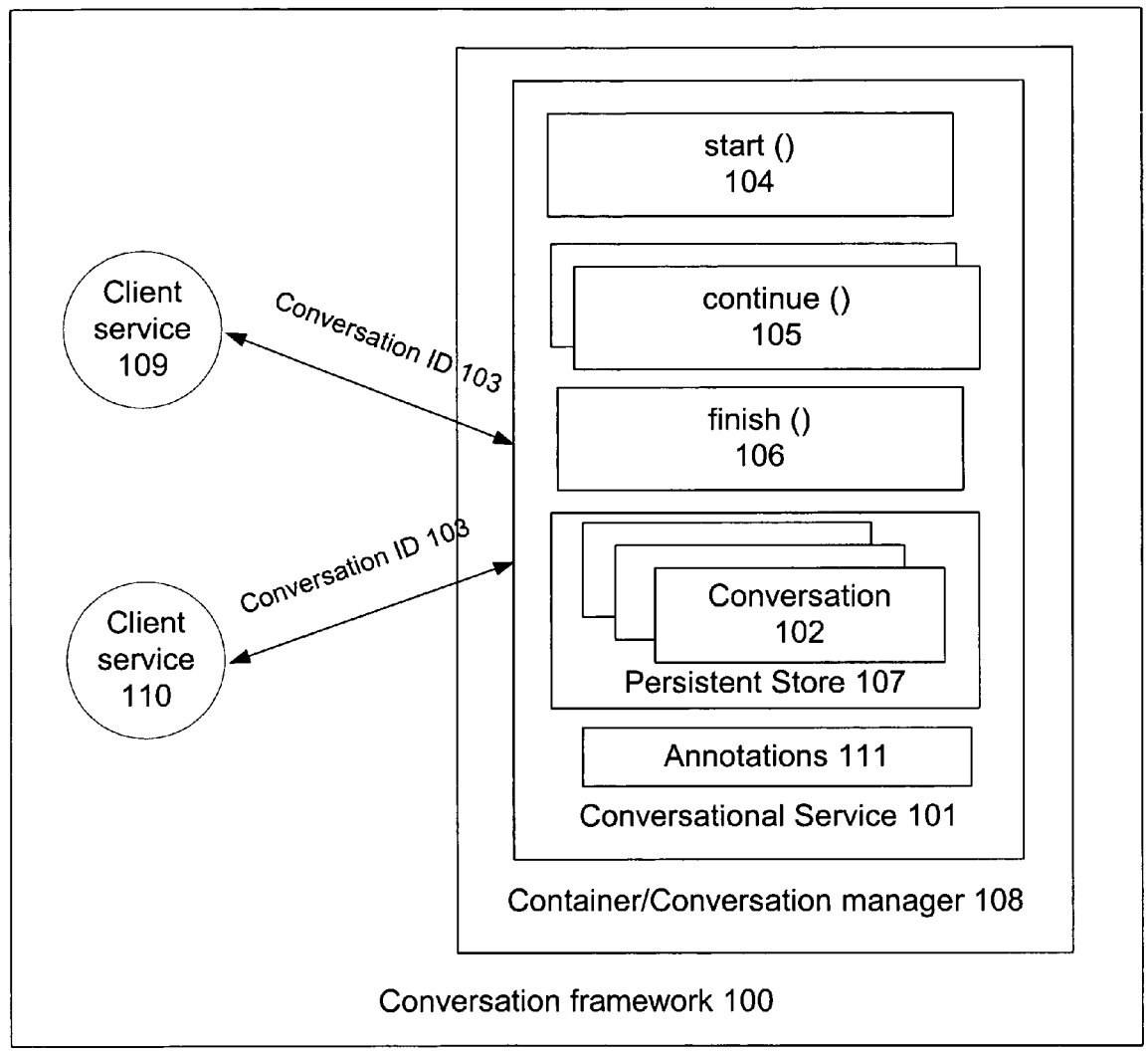
FIG. 1 is an illustration of an exemplary conversation framework based on Web service addressing in one embodiment of the present invention.

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.
Conversation A conversation allows a client to have a stateful interaction with a (conversational) Web service. It keeps business states of the conversation in persistence storage, such as a hard disk, and allows multiple parties to access those states over a long period of time. Different from sessions, which are transient, associated with a specific client (to avoid re-computing its data repeatedly), and internal to the server (service provider), conversations are associated with a business process that can be contacted by multiple partners and persistent (and typically long-lived, requiring human interaction). They may also have a public contract and a strongly defined life cycles.

Conversations require a programming model for accessing conversation state and a mechanism for marking a service as conversational, determining when to start, continue, and terminate a conversation, correlating an incoming message with a conversation, persisting and restoring conversation state. They can be characterized by at least one of the following properties:

1. They are long-running. Conversations typically interact with a variety of outside sources, many of which can take a long time to respond. For a non-limiting example, fulfilling a purchase order (PO) typically requires human approval, which could take several days to obtain. Similarly, fulfilling a quote request might require an inventory and price update from an outside supplier's systems, which could run in batch. As a result, conversations often last for extremely long periods of time—days, weeks, or months.
2. They are typically asynchronous. A conversation acts as the mediator between a number of different systems, many of which are high-latency, such as batch environments, queues, humans. The typical flow for a conversation is to receive an incoming message, do some synchronous processing, post a message to another system, and go back to sleep until the response arrives.
3. They are persistent. Since conversation state is business state, it absolutely must be persisted, although caching would help since many times the conversation state just needs to be examined, not updated.
4. They can be entered from multiple paths. Conversations must interact with a variety of back-end systems using different transports, and must expect to receive callback messages over several different communication paths. For a non-limiting example, a single conversation might need to receive callbacks from Web service partners via HTTP, wait for incoming messages from a messaging service queue, or receive asynchronous notifications from a connector. It must be possible to route messages to the correct conversational instance regardless of the transport and communications protocol.
5. They are uniquely identifiable. Every conversation represents a distinct transaction that is uniquely identifiable. In many cases, the identity of the conversation can be derived from the identity of a business entity involved in the conversation. For a non-limiting example, a purchase order might uniquely identify a PO conversation.
6. They have a well-defined life cycle. A conversation is a lot like a state machine, with well-defined start, intermediate, and termination nodes. The life cycle might be loosely defined (for a non-limiting example, it is done when the message is received by the client) or adhere to a strict state machine.

Various embodiments of the present invention introduces mechanisms that allow conversational Web services to have long running business transactions between multiple parties with persistent states. Web service addressing is used to exchange conversational identifiers between the client(s) who requests the service and the server who provides it. Several new persistence formats and stores are supported. In particular, conversation state can be shred down to XML or serialized objects in a transactional file store or in a cluster-wide in-memory object.

The following is an exemplary conversation consisting of three parties—an agent purchasing goods from a manufacturer, the manufacturer selling the goods, and one or more warehouses containing the goods. The conversation begins with the purchasing agent submitting a purchase order to the manufacturer. The purchasing agent includes a "ReplyTo" address so that notifications about the purchase order can be directed to the proper location via Web service addressing. Upon receipt of the purchase order, the manufacturer updates a few back-end systems then goes to sleep, waiting for the purchase order to be approved. It may possibly send out an e-mail containing a link to an approval screen running in portal. The user may click on the link to review the purchase order displayed in the portal, and then clicks on another button to approve the purchase order. The approval notification awakens the conversation, which sends a shipment notice to a warehouse containing the goods. The warehouse sets the shipment in motion, and responds with a shipment confirmation. Finally, the conversation sends a delivery notice back to the purchasing agent, along with a request for payment via Web service addressing.

FIG. 1 is an illustration of an exemplary conversation framework 100 based on Web service addressing in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a server-side conversational Web service 101 is a state machine, which provides well-defined functions to start 104, continue 105, and to finish 106 a conversation 102 identifiable with an unique conversation id 103. All the conversation instances can be persisted in a persistent store 107. A container 108 in which the conversation service is running can serve as a conversation manager, which actually create, persist, and delete the conversation upon request from the client service (party) 109 or 110. These clients (services) may communicate information, which may include but is not limited to the conversation id, with the conversational service via Web service addressing. Securities and roles can be specified for the conversation service to define access permission for a client to invoke certain methods of the service. for a non-limiting example, annotations 111 can be specified for the conversational service to limit access to the conversation to a client with a specific certificate.

Figure 2:
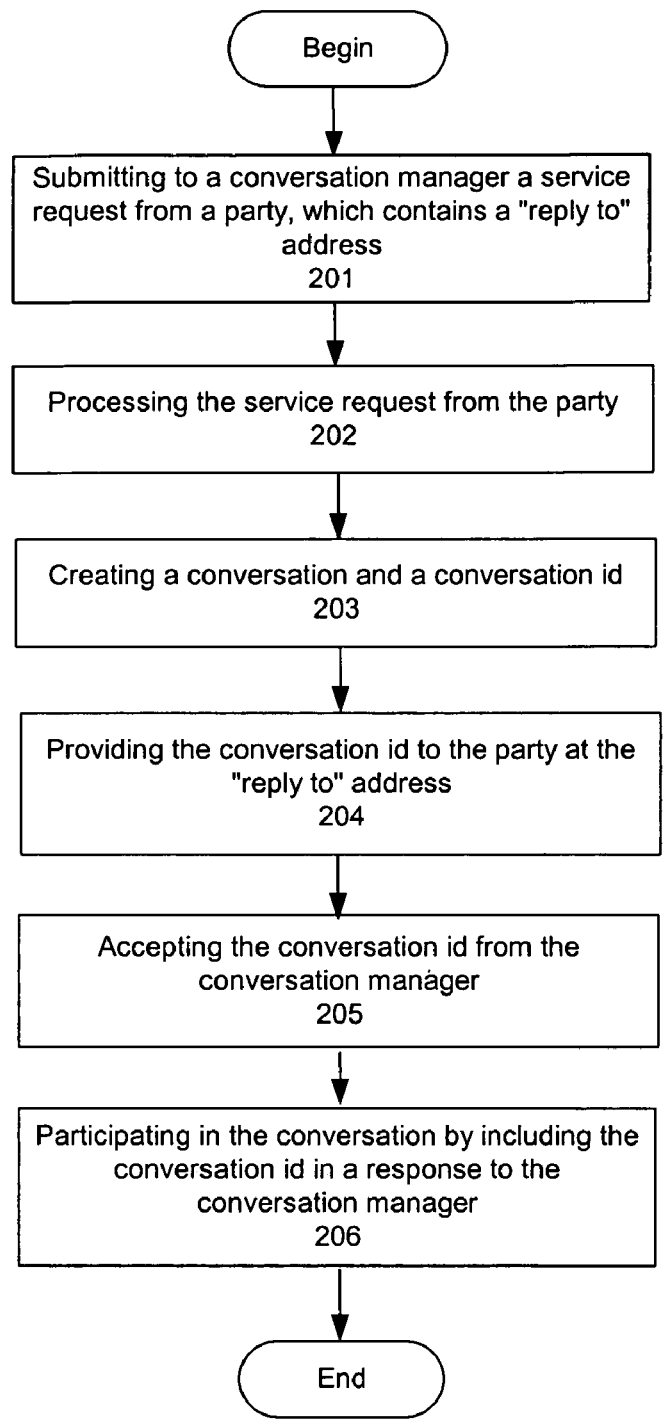
FIG. 2 is a flow chart illustrating an exemplary process of conversational Web service based on Web service addressing in one embodiment of the present invention.

FIG. 2 is a flow chart illustrating an exemplary process of conversational Web service based on Web service addressing in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, a party may start a conversational (service) at step 201 by submitting to a conversation manager a service request, which contains a "reply to" address, which can be used for receiving information (conversation id) and/or for the conversation manager to notify the party. Upon receiving the request, the conversation manager may process the service request at step 202, create a conversation and a conversation id at step 203, and provide the conversation id to the party at the "reply to" address at step 204. Upon accepting the conversation id from the conversation manager at step 205, the party may then participate in the conversation (at a later time) by including the conversation id in a new request for conversation to the conversation manager at step 206.

In some embodiments, conversational service can act like a state machine, where only certain operations are allowed at the certain times node and whether an operation starts or continues a conversation is clearly identified. Conversation operations can be annotated as, for a non-limiting example, @ConversationPhase, with allowable values of "start", "continue", and "terminate". Operations that are not annotated with a conversation mode will be assumed as "continue".

Figure 3:
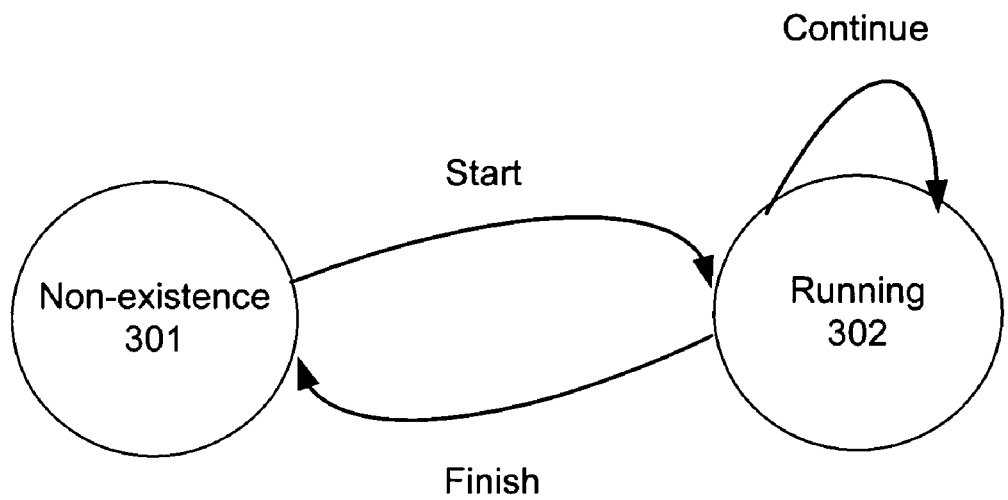
FIG. 3 illustrates an exemplary state transition diagram for conversational Web service in accordance with one embodiment of the present invention.

FIG. 3 illustrates an exemplary state transition diagram for conversational Web service in accordance with one embodiment of the present invention. A client can create a particular conversation with a unique id to be shared among multiple parties by invoking the start method and the conversation will switch from the "Non-existence" state 301 to the "Running" state 302. A conversation will start when an incoming message without a conversation id arrives on an operation with an annotation of "start". It will be possible to call a start operation with a conversation id, or to pull the conversation id from a part of the incoming message body as described in later context. Another client may join an ongoing conversation identified by the conversation id using one of a plurality of continue methods, while the conversation remains in the "Running" state. Messages cannot arrive at a continue/terminate operation without conversation id, which will be rejected with a fault. Once the finish method of the conversation service is called by a client, the current conversation can be closed and switch back to the "Non-existence" state.

In some embodiments, a Web service can be denoted as being conversational via a class-level annotation as shown by the non-limiting example below:

```
@WebService
@Conversational
public class MyConversationalService {
};
```

The instance variables within the service implementation object form the conversation state. By default, all non-transient members are considered part of the conversation state.

In some embodiments, the client may propose the conversation id 103 by sending it in a pre-defined header of the message. The client application proposes a conversation id either by calling a setter such as setConversationId( ) on a name stub of the service, or by setting a property on the stub. The server may then start the conversation with that id.

In some embodiments, the service provider may assign a conversation id if a message arrives for a "start" operation without one. Server-assigned conversation identifiers can be exchanged through Web service addressing. A client may initiate a conversation by calling one of the operations marked "start." If this operation is synchronous, the response message will contain a "ReplyTo" address with the conversation id in reference parameters. The client will then echo this conversation id in all subsequent messages. If the "start" operation is asynchronous and reliable, the "ReplyTo" address and conversation id are returned reliably either with an application response message if the original operation is request/response, or in a separate message if the original operation is one way. If the "start" operation is asynchronous and unreliable, the "ReplyTo" address and conversation id will be sent back unreliably either with an application response message if the original operation is request/response, or in a separate message if the original operation is one way. If the "start" operation is asynchronous, and the conversation id is server-assigned, it is mandatory that the client (sender) defines a "ReplyTo" address and failure to do so will result in a server-side fault. Obviously, no further conversational messages are delivered until the sender received the message containing the server-assigned id.

In some embodiments, the conversation id can be communicated back to any client who has requested the conversation and also supports Web service addressing standard, i.e., it mandates that the client to place its address and a set of other properties in a message or its headers when communicating with the conversational service and the set of properties will be echoed back to the client. Here, Web service addressing can be used to report these headers, so that any Web-service-addressing-aware client can participate in conversational communications. The message to and the one echoed back from the service can occur asynchronously at different time (instead of right away) as long as the same set of the properties or ids are included in both messages. In other words, even if the response to a request is sent at different time, the two can be correlated through the Web service addressing. It enables the conversational service to communicate with clients operating across various platforms and protocols as long as all of them are compliant with (implement) the same Web service addressing protocol. Such Web service addressing is automated and does not require human intervention.

Figure 4:
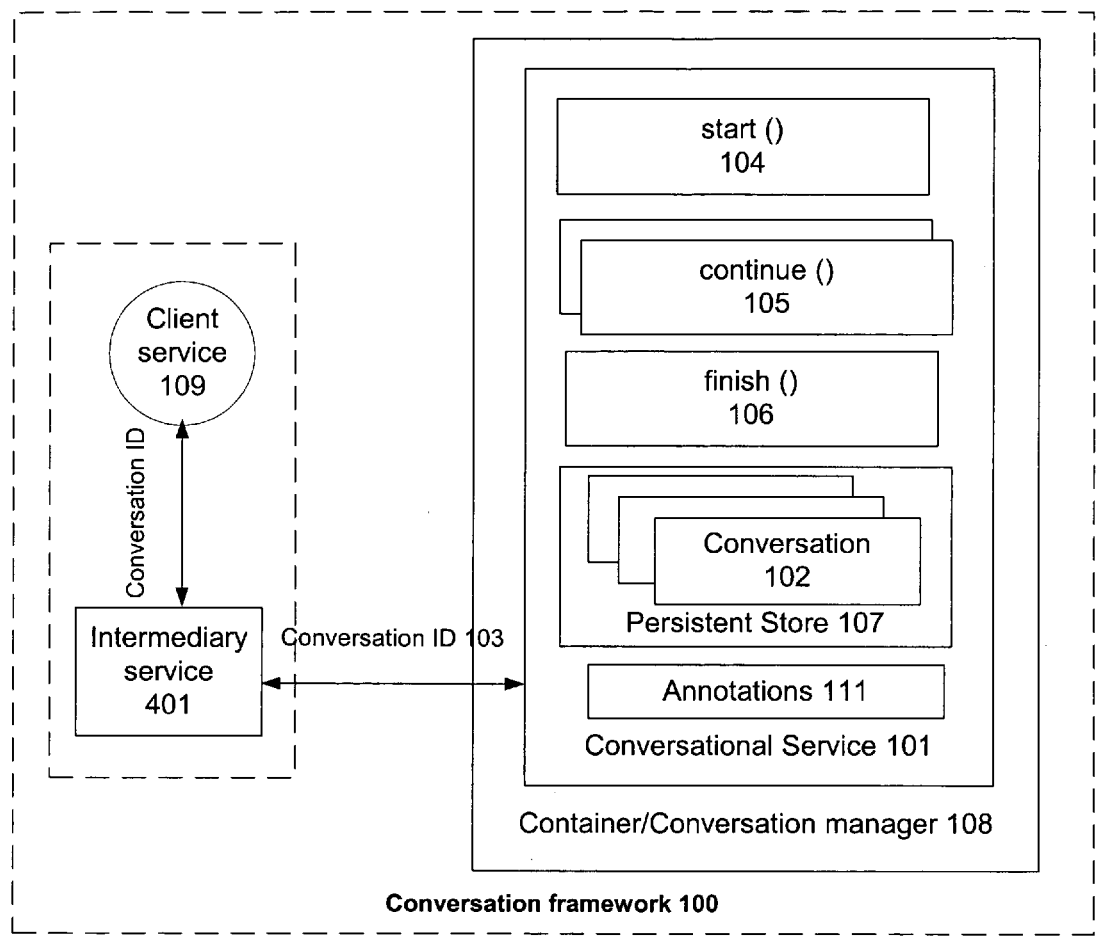
FIG. 4 is an illustration of an exemplary conversation framework using an intermediary Web service in one embodiment of the present invention.

In some embodiments, an intermediary Web service 401 can be utilized on the client side for Web service addressing to accept and relay information such as the conversation id between the client service and the conversational service as shown in the exemplary framework in FIG. 4. Such an additional service is necessary when the information communicated between heterogeneous parties needs to be processed first. For a non-limiting example, some client service may not recognize the conversation id or Web service address sent from the conversational service and such information has to be translated into a form recognizable by the client through the intermediary service.

In some embodiments, conversation instances can be persisted in a cluster-wide map of persistent stores, which is responsible for at least one of:
1. Ensuring that conversational instances can be accessed from anywhere in the cluster of one or more servers (service providers). The entries in the cluster-wide map may be distributed across servers in the cluster, with only one server claiming ownership of a particular entry at a time. For efficiency and correctness, messages will be routed to the server that owns the entry. Such routing uses Web service addressing features to have the client echo back the right amount of information in order to figure out the correct server that the conversational information resides on.
2. Enforcing isolation levels and transactional semantics. The map will automatically be enlisted as a resource in transactions and will ensure that conversation instances put into the map are only made visible when the active transaction commits.
3. Implementing conversation eviction policies (based on criteria such as max-age, max-idle-time), i.e., conversations that have been idle for a particular length of time, or that have exceeded the lifetime of the business transaction will be purged.

In some embodiments, there can be two different map implementations—transient and persistent. The transient map keeps entries in-memory (replicated) while the persistent map keeps entries in a store of transactional file.

Callbacks

Every Web service may be associated with a single interface that represents a callback to a client. On the client side, the client may register an event handler for each callback message it wants to receive. When a callback arrives, the event handler is triggered. In some embodiments, the event handler can be automatically created and registered for the client using annotations. If the client is itself a stateful service, the callbacks will be directed to the instance that made the outbound request.

Traditionally, callbacks are loosely coupled over time with asynchronous Web service and/or messaging, which enables clients to:

Not block or remain connected while waiting for a response. Although simply non-blocking is an important part of asynchrony, it also critical that clients need not remain up and connected while the response is being prepared. The main reason is to support operations that may take a very long time to complete—for a non-limiting example, operations that interact with asynchronous and high-latency systems that include but are not limited to, queuing, mainframes, batch systems, other Web services, and enterprise applications. It also helps to support occasionally connected/disconnected systems that include but are not limited to, laptops, PDAs, WiFi devices and cell phone networks.

Receive more than one message in response to a request. For a non-limiting example, publish/subscribe is the classic ticker scenario, where an endpoint sends a subscription message to a server and begins receiving a ticker feed in response. Market data, news feeds, blog updates, all that stuff fits into this scenario.

Traditionally, callback functions cannot recognize the callback address, which has to be provided by the client explicitly as a parameter to the service provider. The service provider will then create a stub (software component) pointing to that address when sending the response back to the client. Such an approach implemented at the application level can be very inefficient.

Various embodiments of the present invention enable related parties to setup asynchronous messaging exchanges between Web services based on Web service addressing. A "CallbackTo" header may include the address to which application level responses are sent. At its most basic, asynchronous messaging is about callbacks: the client sends a request to the service provider and provides it with a callback address. When the response is ready, the service provider sends it to that callback address. Under the present invention, all the callback address lookup, population and setup can be performed automatically by the service provider at the infrastructure level transparent to the user and only the service/contract itself need to be defined.

Figure 5:
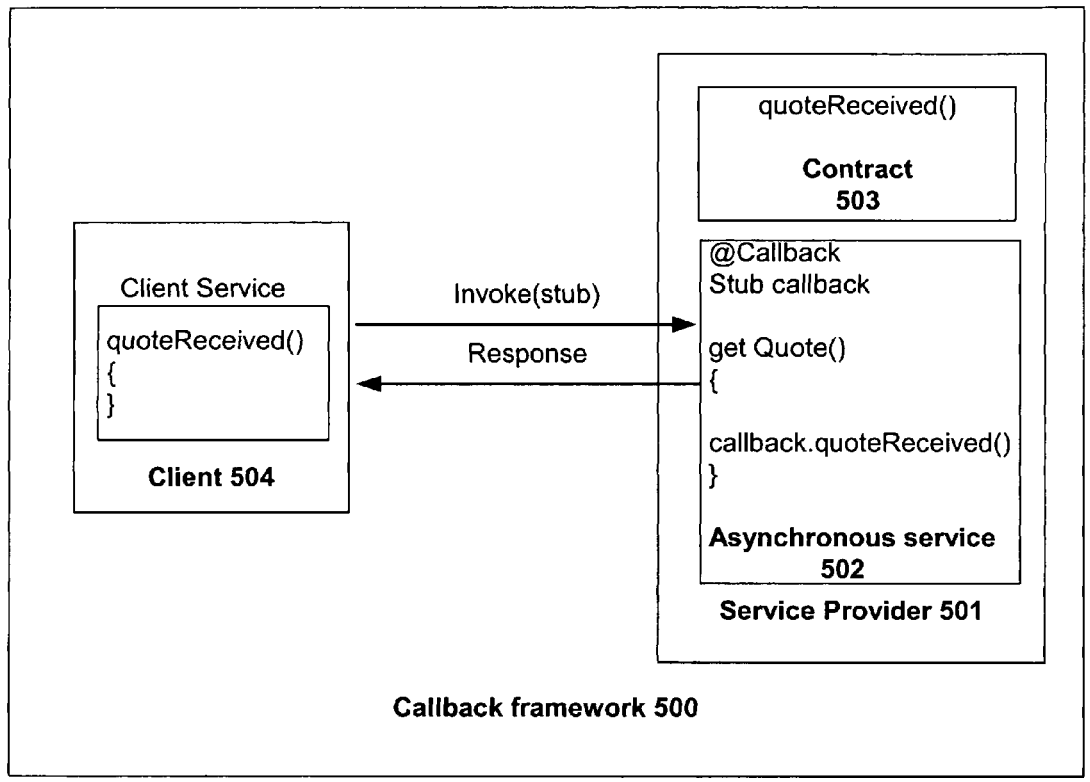
FIG. 5 is an illustration of an exemplary callback framework based on Web service addressing in one embodiment of the present invention.

FIG. 5 is an illustration of an exemplary callback framework 500 based on Web service addressing in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 5, service provider 501 may provide an asynchronous Web service 502, e.g., getQuote( ), which may not provide quote to the client right away. The service provider may also define a contract (interface) 503, which any client 504 must implement (by providing a handler for) in order to communicate with the service provider. For a non-limiting example, in order to receive the quote from the service provider later on, the client service must implement a contract named quoteReceived( ). The service provider may define a callback variable (stub), which can be annotated by @Callback so that this stub will be populated with all the information needed to do callback.

Figure 6:
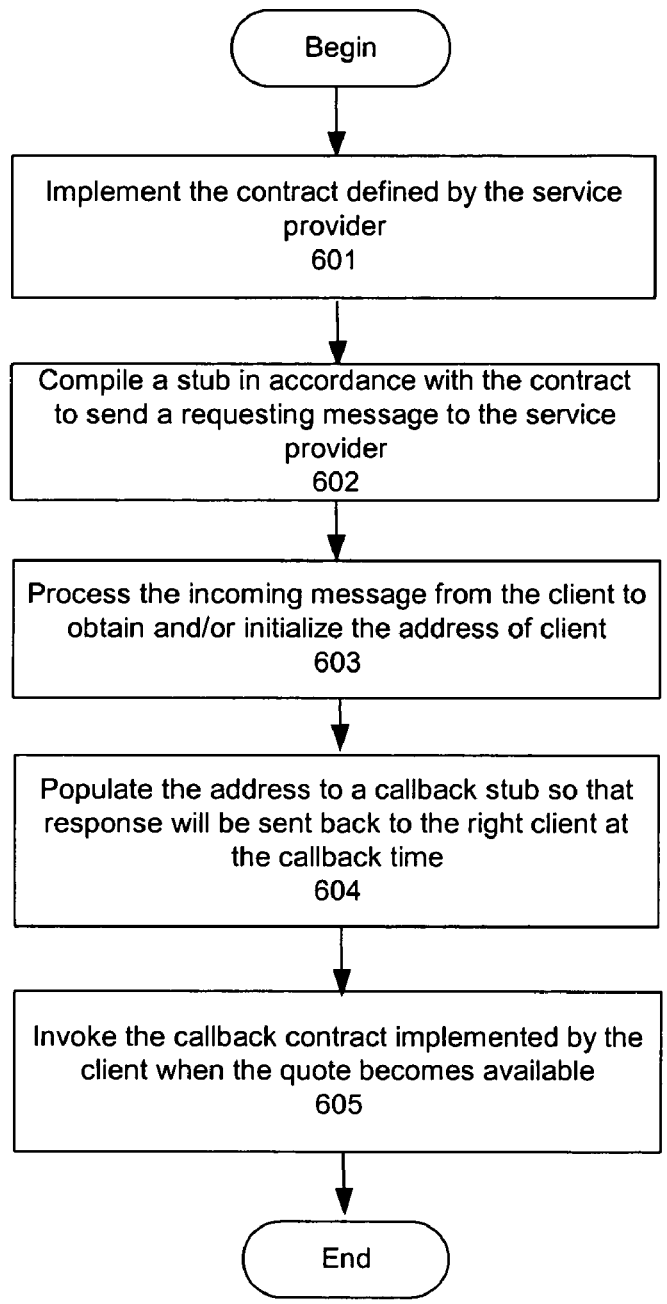
FIG. 6 is a flow chart illustrating an exemplary callback process based on Web service addressing in one embodiment of the present invention.

FIG. 6 is a flow chart illustrating an exemplary callback process based on Web service addressing in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 6, a client needs to implement a contract defined by the service provider first at step 601 before it can request for service. When the client requests for a quote at step 602, it will automatically compile a software component such as a stub in accordance with the contract to send the requesting message to the service provider. When Web service addressing is utilized, the service provider will automatically process the incoming message and its header from the client to obtain and/or initialize the address of client (where the message is coming from) at step 603, and populate it to a callback stub at step 604 so that response will be sent back to the right client at the callback time. When the quote becomes available, it will invoke the callback contract implemented by the client at step 605.

In some embodiments, for integration with conversational service, the callback proxy stub needs to be part of the conversational state on the service side to be called back later. The only thing that needs to be saved is the callback endpoint reference and any invoke properties. On the client side, the callback objects need to be part of the conversational state and have to be serializable.

In some embodiments, the callback can be reused many times over a period of time once initialized when the service is conversational (asynchronous) and the service provider may wait for the information to be available before calling back to the client. Under the conversational scenario, the stub will be kept as part of the persisted conversational state; Under the non-conversational scenario, the stub will be related only to the current calling client and can be created and included automatically as a method parameter in the incoming request.

Asynchronous Request Response

Figure 7:
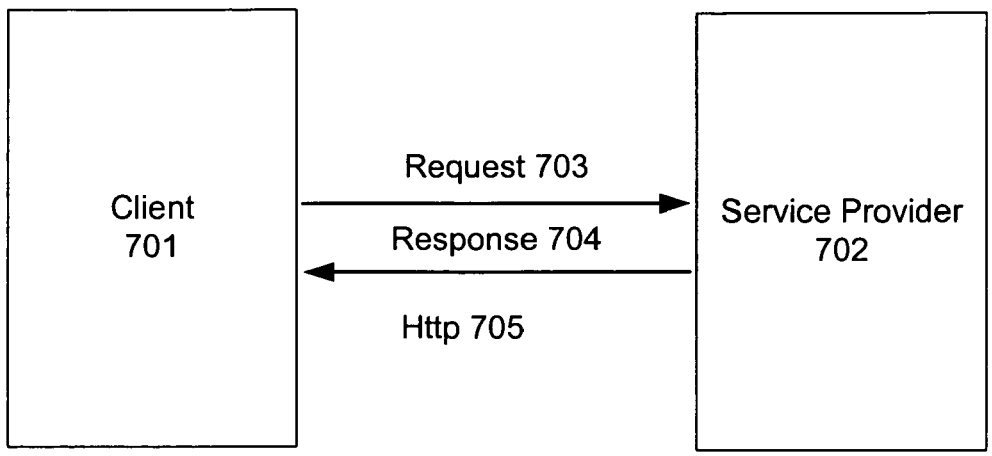
FIG. 7 (a)-(b) are illustrations of an exemplary asynchronous request response framework in one embodiment of the present invention.
Figure 7:
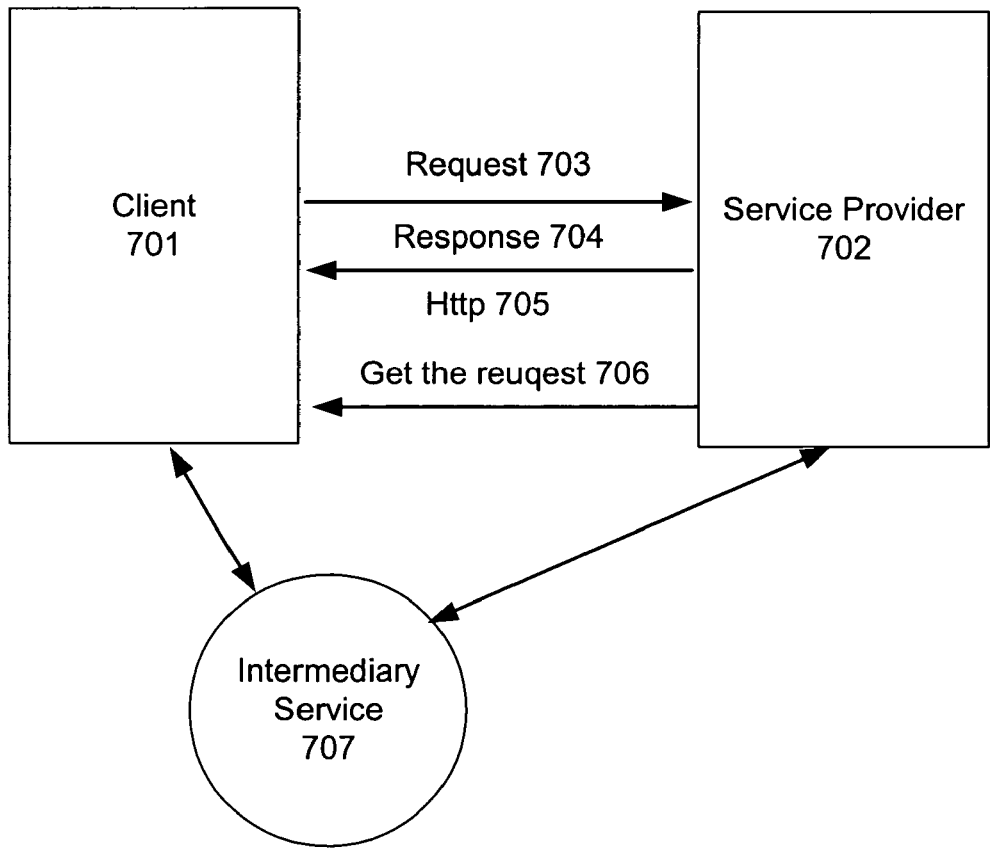

Traditionally, a client 701 may invoke a Web service from a service provider 702 by sending a request 703 to the server and the service provider will respond 704 via the same http connection 705 as shown in FIG. 7 (a). Such framework may not apply when asynchronous messaging or callback is utilized as discussed earlier.

FIG. 7 (b) is an illustration of an exemplary asynchronous request response framework in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 7 (b), the server will respond first with a "get the request" type of response 706 instead of an actual and immediate response to the user's request, which will be sent later (i.e., asynchronously) in a separate message when the response becomes available at the service provider. Alternatively, the service provider may also send the actual response to an intermediary Web service 707, which will translate the response into a format acceptable by the client before relaying it to the client.

Figure 8:
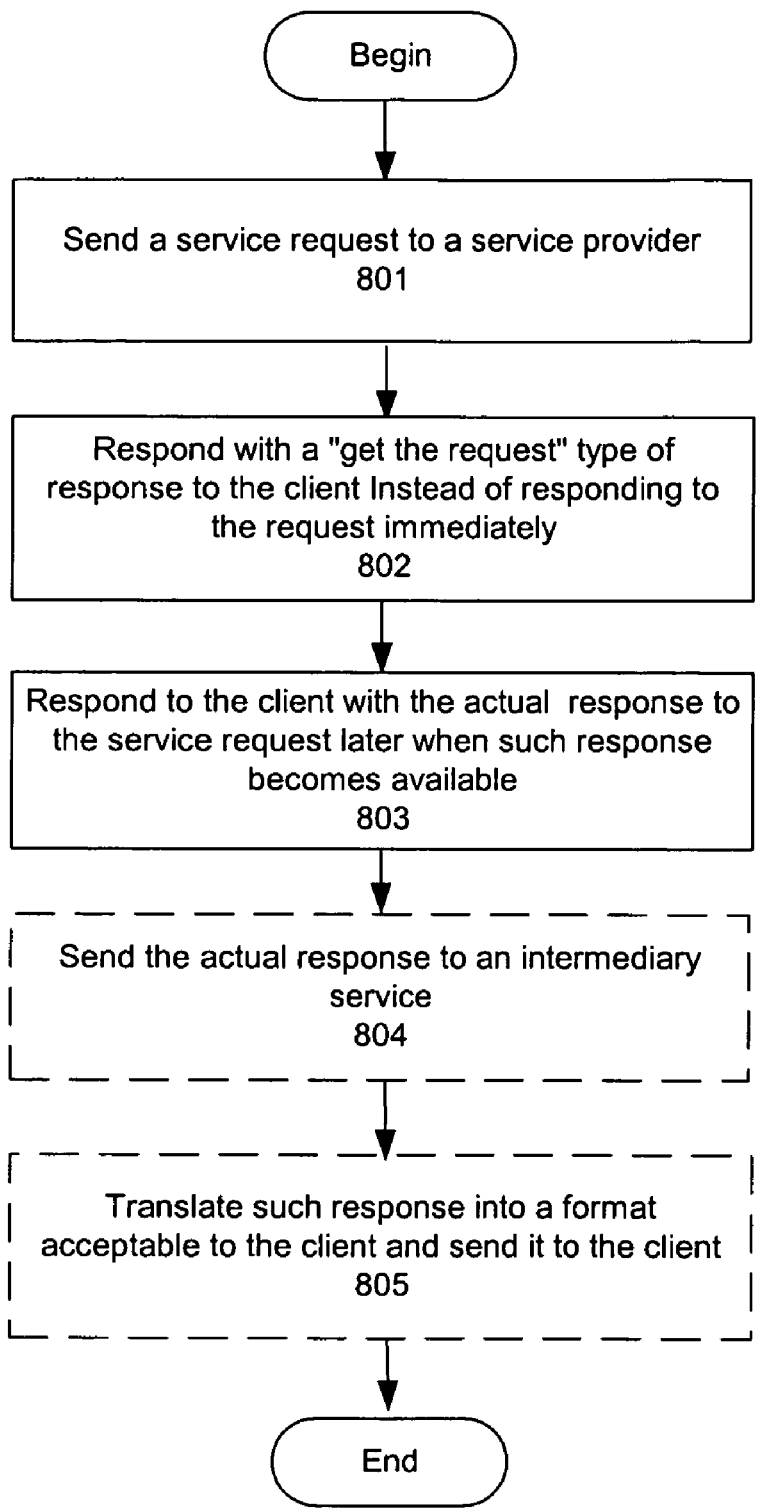
FIG. 8 is a flow chart illustrating an exemplary callback process based on Web service addressing in one embodiment of the present invention.

FIG. 8 is a flow chart illustrating an exemplary asynchronous request response process in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 8, a client may send a service request to a service provider at step 801. Instead of responding to such request immediately, the service provider will respond with a "get the request" type of response to the client at step 802. At step 803, the service provider will respond to the client with the actual response to the service request later when such response becomes available. Alternatively, the service provider will send the actual response to an intermediary service at step 804, which will then translate such response into a format acceptable to the client and send it to the client at step 805.

In some embodiments, a generic async response service can be deployed on the same server as the client service, shown as the exemplary service "Foo" in FIG. 9 (*a*). When the hello world service shown in FIG. 9 (*b*) is invoked from within Foo, a "reply-to" address is included that points to the async response service. This way, all addressing-aware servers will send the response back to the async response service.

In some embodiments, a handler chain can be saved when the service request is submitted asynchronously so that it can be used later to bind the result. Message id can be used to save the handler chain in an in-memory store. In addition, the handler chain and the message context on the handler chain can be saved in a persistent map within the cluster as discussed earlier. This way, the result can still be bounded even if the server goes down. When the response gets to the async response service, it will look up the handler chain saved and invoke it to bind the result. If there has been a reboot of the server, the handler chain will be reinitialized and the message context saved in the persistent map will be set on the handler chain. Thus, states can always be saved on the message context as long as it's serializable and should not be saved within an internal handler if asynchronous request/response is to survive a reboot.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "servlet" is used in the embodiments of the systems and methods described above, it will be evident that such concept can be interchangeably used with equivalent concepts such as, class, method, type, interface, bean, component, object model, and other suitable concepts. While the concept "interface" is used in the embodiments of the systems and methods described above, it will be evident that such concept can be interchangeably used with equivalent concepts such as, bean, class, method, type, component, object model, and other suitable concepts. While the concept "configuration" is used in the embodiments of the systems and methods described above, it will be evident that such concept can be interchangeably used with equivalent concepts such as, property, attribute, annotation, field, element, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide a conversational service, comprising:

a service provider operable to:

accept a service request message for the conversational service from a first client, wherein the service request message contains a callback address of the first client in a header of the service request message, wherein the callback address is based on a web service addressing protocol and is independent of an underlying transport protocol;

define the conversational service as a contract based on the web service addressing protocol, wherein the first client implements the contract and the contract allows the first client to communicate with the service provider;

create a conversation and a conversation identification;

automatically perform a callback address lookup that is transparent to the first client and is independent of the underlying transport protocol; and provide a response associated with the conversation identification to the first client associated with the callback address using an intermediary service, wherein the response is in a uniform format independent of the underlying transport protocol, wherein the intermediary service operates to translate the response from the uniform format into a format acceptable by the first client; and relay information between the service provider and the first client.

2. The system according to claim 1, further comprising:
a second client operable to:
  accept the conversation identification contained in a construct from the service provider; and
  participate in the conversation with the first client by embedding the conversation identification in its response to the service provider.

3. The system according to claim 2, wherein:
the construct can be an endpoint reference or a message information header.

4. The system according to claim 2, wherein:
the service provider operable to at least one of:
  providing the conversation identification to the second client in the construct;
  putting the conversation to sleep while waiting for a response from the second client; and
  notifying the first client upon receiving the response from the second client.

5. The system according to claim 2, wherein:
the first client, the second client and the service provider are operable to communicate asynchronously via the conversation identification.

6. The system according to claim 1, wherein:
the first client can be a web service.

7. The system according to claim 1, wherein:
the service provider is further operable to extract the conversation identification from the first client's service request message.

8. The system according to claim 1, wherein:
the conversational service can be a state machine.

9. The system according to claim 1, wherein:
the conversational service is operable to provide a plurality of methods.

10. The system according to claim 9, wherein:
the service provider is further operable to define access permission for at least one of the first client and the second client to the plurality of methods of the conversational service.

11. The system according to claim 1, wherein:
the service provider is further operable to save the conversation in a persistent store that allows multiple parties to access over a lifecycle of the conversation.

12. The system according to claim 1, wherein:
the service provider is further operable to notify the first client directly of getting the service request message in a format that is acceptable by the first client, before responding to the first client with the response later, via the intermediary service, when the response becomes available, wherein the uniform format is not acceptable by the first client.

13. The system according to claim 1, wherein:
the service request message is associated with a handler chain that is adapted to be saved by the first client when the service request is submitted asynchronously and the handler chain is used later to handle the response received by the first client.

14. The system according to claim 1, wherein:
the service provider can define a call back stub based on the contract, wherein the call back stub is a software component that is annotated and is populated with information needed for a callback operation.

15. The system according to claim 14, wherein:
the service provider can automatically process the service request message with the header to obtain the address of the first client and provide the address of the first client to the call back stub so that a response can be sent back to the first client at a callback time.

16. A method to provide conversational service via web service addressing, comprising:
  accepting a service request message for a conversational service from a first client, wherein the service request message contains a callback address of the first client in a header of the service request message, wherein the callback address is based on a web service addressing protocol and is independent of an underlying transport protocol;
  defining the conversational service as a contract based on the web service addressing protocol, wherein the first client implements the contract and the contract allows the first client to communicate with the service provider;
  processing the service request message and creating a conversation and a conversation identification;
  automatically performing a callback address lookup that is transparent to the party and is independent of the underlying transport protocol;
  providing, via a service provider, a response associated with the conversation identification to the first client associated with the callback address using an intermediary service, wherein the response is in a uniform format independent of underlying transport protocol;
  translating, via the intermediary service, the response from the uniform format into a format acceptable by the first client; and
  relaying information between the service provider and the first client.

17. The method according to claim 16, further comprising:
  providing the conversation identification contained in a construct to a second client;
  putting the conversation to sleep while waiting for a response from the second client;
  accepting the conversation identification in the construct from the service provider; and
  participating in the conversation with the first client by embedding the conversation identification in a response to the service provider.

18. The method according to claim 17, further comprising at least one of:
  notifying the first client upon receiving the response from the second client; and
  communicating among the first client, the second client, and the service provider asynchronously via the conversation identification.

19. The method according to claim 16, further comprising at least one of:
  extracting the conversation identification from the service request;
  persisting the conversation in memory or in a persistent store;
  managing the conversation via the conversational service, which can be a state machine; and
  defining access permission for the party to a plurality of methods provided by the conversational service.

20. A machine readable medium having instructions stored thereon that when executed cause a system to:
  accept a service request message for a conversational service from a first client, wherein the service request message contains a callback address of the first client in a header of the service request message, wherein the callback address is based on a web service addressing protocol and is independent of an underlying transport protocol;

define the conversational service as a contract based on the web service addressing protocol, wherein the first client implements the contract and the contract allows the first client to communicate with the service provider;

process the service request message and creating a conversation and a conversation identification;

automatically performing a callback address lookup that is transparent to the first client and is independent of the underlying transport protocol;

provide, via a service provider, a response associated with the conversation identification to the first client associated with the callback address using an intermediary service, wherein the response is in a uniform format independent of underlying transport protocol;

translate, via the intermediary service, the response from the uniform format into a format acceptable by the first client; and relay information between the service provider and the first client.

21. A system to provide conversational service via web service addressing, comprising:

means for accepting a service request message for a conversational service from a first client, wherein the service request message contains a callback address of the first client in a header of the service request message, wherein the callback address is based on a web service addressing protocol and is independent of an underlying transport protocol;

means for defining the conversational service as a contract based on the web service addressing protocol, wherein the first client implements the contract and the contract allows the first client to communicate with the service provider;

means for processing the service request message and creating a conversation and a conversation identification;

means for automatically performing a callback address lookup that is transparent to the first client and is independent of the underlying transport protocol;

means for providing, via a service provider, a response associated with the conversation identification to the first client associated with the callback address using an intermediary service, wherein the response is in a uniform format independent of underlying transport protocol;

means for translating, via the intermediary service, the response from the uniform format into a format acceptable by the first client; and means for relaying information between the service provider and the first client.

\* \* \* \* \*

UNITED STATES PATENT AND TRADEMARK OFFICE
CERTIFICATE OF CORRECTION

| | | |
|---|---|---|
| PATENT NO. | : 8,271,602 B2 | Page 1 of 1 |
| APPLICATION NO. | : 11/329898 | |
| DATED | : September 18, 2012 | |
| INVENTOR(S) | : Jin et al. | |

It is certified that error appears in the above-identified patent and that said Letters Patent is hereby corrected as shown below:

In column 1, line 12, delete "BASED:" and insert -- BASED --, therefor.

In column 4, line 40, delete "service. for" and insert -- service for --, therefor.

Signed and Sealed this
Eighth Day of January, 2013

David J. Kappos
*Director of the United States Patent and Trademark Office*